United States Patent
Rzevski et al.

(10) Patent No.: US 7,562,002 B2
(45) Date of Patent: Jul. 14, 2009

(54) AGENT, METHOD AND COMPUTER SYSTEM FOR NEGOTIATING IN A VIRTUAL ENVIRONMENT

(75) Inventors: George Rzevski, London (GB); Peter Skobelev, Samara (RU)

(73) Assignee: Magenta Corporation, Ltd., Windsor (GB)

( * ) Notice: Subject to any disclaimer, the term of this patent is extended or adjusted under 35 U.S.C. 154(b) by 473 days.

(21) Appl. No.: 10/503,372
(22) PCT Filed: Feb. 3, 2003
(86) PCT No.: PCT/GB03/00443

§ 371 (c)(1),
(2), (4) Date: May 24, 2005

(87) PCT Pub. No.: WO03/067432

PCT Pub. Date: Aug. 14, 2003

(65) Prior Publication Data

US 2006/0020565 A1    Jan. 26, 2006

(30) Foreign Application Priority Data

Feb. 4, 2002    (GB) ................... 0202527.8

(51) Int. Cl.
*G06F 9/445* (2006.01)
*G06B 19/418* (2006.01)
*B25J 9/16* (2006.01)
(52) U.S. Cl. .............................. 703/22; 706/46; 700/248
(58) Field of Classification Search ..................... 703/2, 703/22; 717/1, 101, 4; 700/248; 715/716; 706/46; 709/228

See application file for complete search history.

(56) References Cited

U.S. PATENT DOCUMENTS

| | | | |
|---|---|---|---|
| 6,266,805 B1 | 7/2001 | Nwana et al. | |
| 6,314,555 B1 * | 11/2001 | Ndumu et al. | 717/101 |
| 6,636,781 B1 * | 10/2003 | Shen et al. | 700/248 |
| 6,850,252 B1 * | 2/2005 | Hoffberg | 715/716 |
| 2004/0098358 A1 * | 5/2004 | Roediger | 706/46 |
| 2004/0210661 A1 * | 10/2004 | Thompson | 709/228 |

FOREIGN PATENT DOCUMENTS

GB    2319862 A    6/1998

(Continued)

OTHER PUBLICATIONS

Hlupic, V., et al., "Knowledge Management in E-Commerce: The Use of Intelligent Agents," *Proceedings of the ITI 02 (Information Technology Interface) Conference*, pp. 1-7 (2002).

(Continued)

*Primary Examiner*—Thai Phan
(74) *Attorney, Agent, or Firm*—Hamilton, Brook, Smith & Reynolds, P.C.

(57) ABSTRACT

A multi-agent system is described that uses software agents to represent objects in a chosen real world environment. Each agent has structure having certain characteristics where a relation with other agents can be established if the other agents have characteristics that are suitable to the requesting agent. The multi-agent system is able to perform dynamic negotiations autonomously between agents so as to establish relations when a new event enters the system or to offer compensation to modify existing relations and to self-organise to optimise the overall value of the system.

29 Claims, 8 Drawing Sheets

FOREIGN PATENT DOCUMENTS

| | | |
|---|---|---|
| GB | 2 382 679 A | 6/2003 |
| GB | 2 390 194 A | 12/2003 |
| WO | WO 97/26612 A1 | 7/1997 |
| WO | WO 00/19663 A1 | 4/2000 |
| WO | WO 01/25995 A1 | 4/2001 |

OTHER PUBLICATIONS

Pedrycz, W., et al., "Clustering in the Framework of Collaborative Agents," *2002 IEEE World Congress on Computational Intelligence, IEEE International Conference on Fuzzy Systems, Fuzz-IEEE' 02 Proceedings*, 1, pp. 134-138 (2002).

Rzevski, G., "On Multi-Agent Systems and Distributed Intelligence," MADIRA Paper 021, Version 1.0, published on MADIRA website www.brunel.ac.uk/research/madira, Nov. 18, 2002.

Ulieru, M., "A Fuzzy Evolutionary Approach for Collaborative Clustering in Multi-Agent Systems with Application to Emergent Virtual Organizations," *2002 IEEE Work Congress on Computational Intelligence, 2002 IEEE International Conference on Fuzzy Systems. Fuzz-IEEE'02 Proceedings*, 1, pp. 197-202 (2002).

Vittikh, V. A.., et al., "Multi-agent Systems for Modelling of Self-Organization and Cooperation Processes," Thirteenth International Conference on Applications of Artificial Intelligence in Engineering AIENG XIII, Galway, Ireland, pp. 91-96 (Jul. 7-9, 1998).

Kowalczyk, R., et al., "On Fuzzy e-Negotiation Agents: Autonomous Negotiation With Incomplete and Imprecise Information," Proceedings 11th International Workshop on Database and Expert Systems Applications, London, UK, pp. 1034-1038 (Sep. 4-8, 2000).

Kim, K., et al., "Compensatory Negotiation for Agent-Based Project Schedule Coordination," Proceedings Fourth International Conference on Multiagent Systems, Boston, MA, pp. 405-406 (Jul. 10-12), 2000.

Batishev, S., et al., "A Multi-Agent Simulation of Car Manufacturing and Distribution Logistics," Magenta Multi-Agent Applications-Articles, Proc. of the II International Conference, Samara, Russia, 5 pgs., (Jun. 20-23, 2000).

Keesoo, K., et al., "Compensatory Negotiation for Agent-Based Project Schedule Optimization and Coordination," Working Paper No. 55,.Center for Integrated Facility Engineering, Stanford Univ., 2 pgs., (Jan. 2000).

Batishchev, S., et al., "Magenta Multi-Agent Systems: Engines, Ontologies and Applications," Magenta Multi-Agent Applications-Articles, Proc. of the 3rd Intern. Workshop on Computer Science and Information Technologies CSIT2001, Ufa, Russia, pp. 1-7 (Sep. 21-26, 2001).

Fischer, K., et al., "A Simulation Approach Based on Negotiation and Cooperation Between Agents: A Case Study," IEEE Transaction on Systems, Man and Cybernetics, Part C (Applications and Reviews), pp. 531-545 (Nov. 1999).

\* cited by examiner

| No. | Offers | Product class | Cost | Time of delivery | Agent's gross margin | System gross margin |
|---|---|---|---|---|---|---|
| | | | | | | |

| No. | Product | Current averge price | Increase or decrease |
|---|---|---|---|
| | | | |

AGENT, METHOD AND COMPUTER SYSTEM FOR NEGOTIATING IN A VIRTUAL ENVIRONMENT

RELATED APPLICATIONS

This application is the U.S. National Stage of International Application No. PCT/GB03/00443, filed Feb. 3, 2003, published in English, and claims priority under 35 U.S.C. § 119 or 365 to Great Britain Application No. 0202527.8, filed Feb. 4, 2002.

The present invention is concerned with managing a virtual environment and is particularly but not exclusively concerned with software agents and a computer system for executing such agents. The invention is also concerned with a method of simulating a real environment and of managing demands and resources using a simulated environment.

Computer simulations of real environments have increasing importance in the modern world. Many systems, traditionally placed under human control, have recognised the benefits of automatic control performed by computers. This is evident in most sectors, for example an industrial production line, auto-pilot function on aircraft, etc. The considerable processing power and consistency of output afforded by modern computing platforms, have resulted in the growing trend for placing systems under computer control. The level of autonomous behaviour, that is independent of human intervention, is governed only by the perceived intelligence of the system.

Computing concepts such as artificial intelligence, fuzzy logic, neural networks, etc are often used to increase the so-called "intelligence" control of a system. In particular, the growth of so-called "agents" has increased. An agent, as described herein, is a software object capable of communicating autonomously and intelligently with other agents.

A system can be modelled by identifying the key elements of the system and then developing specialised agents that have the same properties and attributes to represent those key elements.

The problem of the allocation of resources is well understood for the case when all resources and all demands for resources in a system are known in advance, and can be solved using existing technology. However, real market conditions are so turbulent that often the demand for resources is subject to frequent and unpredictable changes. The allocation of resources is dynamic. Under such conditions algorithms for the allocation of resources must include a provision for frequent and rapid re-allocation. Conventional programs cannot cope with these conditions.

Multi-agent systems offer an effective method for the dynamic allocation and re-allocation of resources to frequently changing demands.

One object of the present invention is to provide a modelling technique, and components associate therewith capable of the dynamic allocation of resources in a system.

According to a first aspect of the present invention there is provided an agent adapted for negotiating in a virtual environment, the agent comprising: an agent descriptor implemented as an executable program and comprising a set of properties which determine the negotiating characteristics of the agent; and an agent body implemented as an executable program and comprising at least one sensor for receiving information from the virtual environment, at least one actuator for interacting with the environment, and a decision engine operable in an active state during a predetermined time period to execute a decision making process based on the information received from the at least one sensor wherein the decision engine is operable to establish a relation with another agent in dependence on the negotiating characteristics and to determine a value representing the quality of the established relation.

According to a second aspect of the present invention there is provided a method of simulating a real environment by creating a virtual environment comprising a plurality of agents as described above, the method comprising: for at least some of said agents, invoking an active state of the agent for a predetermined time period; for each active agent, implementing a decision making process based on the information received from the at least one sensor according to the negotiating characteristics of the agent to determine whether a relation can be established with another agent; and after said predetermined time period invoking a passive state of the agents, wherein said agents have a free or paired status and wherein paired agents hold a value determining the quality of the relation they have established.

According to a further aspect of the present invention there is provided a method of operating a computer to implement an agent adapted for negotiating in a virtual environment, the method comprising: executing a first program defining an agent descriptor comprising a set of properties which determine the negotiating capability of the agent; setting up an agent body by providing at least one sensor for receiving information from the virtual environment and at least one actuator for interacting with the environment; and executing a second program to implement a decision engine associated with said at least one sensor, said decision engine being operable in an active state during a predetermined time period to execute a decision making process based on the information received from the at least one sensor according to the negotiating characteristics of the agent wherein the decision engine is operable to establish a relation with another agent in dependence on the negotiating characteristics and to determine a value representing the quality of the established relation.

According to yet a further aspect of the present invention there is provided A method of operating a computer system to manage demands and resources, the method comprising: generating a scene representing the current state of resources and demands; instantiating a plurality of agents as executable programs, including a first set of resource agents representing resources and a second set of demand agents representing demands, wherein each agent is operable to exchange messages with another agent and comprises a decision engine for executing a decision making process based on information from the scene and messages from said other agent to implement a relation with said other agent and to associate a relation value with said relation; and comparing that relation value with a reference value for the relation to determine whether the relation is satisfactory or not.

According to another aspect of the present invention there is provided a computer system configured as a virtual world representing a real world, the system comprising: a first set of demand agents implemented as executable programs, each comprising a set of properties representing demands in the real world; a second set of resource agents implemented as executable programs, each comprising a set of properties representing resources in the real world; wherein the demand agents and the resource agents are operable to negotiate by exchanging messages, said messages containing said sets of properties corresponding to the demands and resources of each agent so that a decision engine can establish a relation based on predefined criteria; and wherein when a new demand or resource enters the system, an agent representing the new demand or resource is able to disturb an established relation between a pair of agents by offering compensation to improve a value representing the quality of the established relation.

According to yet another aspect of the present invention there is provided a computer system comprising a processor for executing a plurality of programs, each program represents an agent for negotiating in a virtual environment and a memory which stores a plurality of agent definers, each agent definer having an ontology comprising: a set of properties defining the nature of the agent; a set of attributes defining characteristics used for negotiating purposes by the agent; a set of scenarios executable by the agent to implement different decision making processes; and a relation quality store for holding a value defining the quality of a relation established by the agent.

For a better understanding of the present invention and to show how the same may be carried into effect, reference will now be made by way of example to the accompanying drawings in which.

Figure 1:
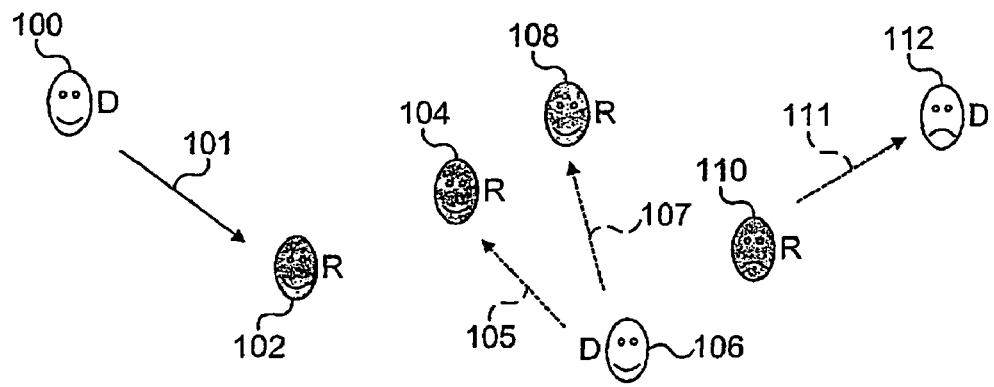
FIG. 1 shows an example of a virtual world scene.

Before describing the preferred embodiments of the invention, a brief explanation of the underlying concept will be given. A virtual world is as the name suggests, an artificial system that is created in an attempt to simulate a real system. The virtual world in the context of the present invention is a system where the allocation of resources to demands takes place. Such a virtual world is created by identifying the various components of a real world system and then mimicking their behaviour using software objects that have certain properties and attributes.

These software objects are called "agents" and are capable of interpreting information received from other objects making up the virtual world. An agent in this type of virtual world may be allocated to each demand and each resource. Based on inputs, agents can make knowledge-based decisions, which are then output to other elements of the virtual world.

It will be appreciated that the inputs and outputs interface with the real or physical world to allow a user to control the system and to utilise its results. Interfaces with the real world may take the form of any known input and output devices for computer systems.

It is possible to create a virtual world using agents having properties and attributes which can establish relations with one another. Agents in the virtual world may be so-called "free" agents where there is no relation established with any another agents. In this case, free agents will try and establish relations with other agents by matching itself with other agents, which it identifies as potential partners using identifiable characteristics. Such a matching process is called a negotiation. A relation between agents is only established if all agents to the negotiation agree and the agreement will be granted only if the proposed relation meets predefined criteria. This criteria might be a matching of certain characteristics between agents, such as a particular property, attribute and/or value. This is discussed in more detail in the following.

A free agent which searches the system for a match will be in an "active" state. If no suitable match is found, the agent switches to a "passive" state and waits for an alteration in the state of the virtual world. A state of the virtual world at some moment in time is called a "scene". Agents that have already established relations with other agents may also switch to a passive state, because they may be activated again if there is a change in the state of the virtual world. A change in the "scene" can be caused by a new 'event', i.e. the arrival of a new demand or resource causing the creation of a new agent. Agents communicate with each other and with the virtual world by "messages".

Agents are either "free", in a "dissatisfied" relation or a "satisfied" relation. The meaning of these terms is discussed later. When there is a change in the state of the virtual world, or at initialisation, the process follows the sequence that free agents are activated first, dissatisfied agents are activated second and satisfied agents are activated last. For purposes of matching, each agent holds a minimum and maximum value for the property or attribute it is trying to match. Agents seeking to match characteristics can prioritise the particular characteristics they require. Agents are said to be 'satisfied' if for the established relation between the agents their respective maximum values for characteristics are met. An agent can still establish a 'dissatisfied' relation if the match is to an agent where the value of a requested characteristic is greater than or equal to the minimum value. A relation will not be established with an agent, if the value of the requested characteristic for that agent is below the minimum value. Thus, a relation may exists between dissatisfied agents, but an agent's dissatisfaction is a strong reason for reconsidering the established relation and such agents are considered next in the sequence after all free agents have been checked for a suitable match. Finally, satisfied agents are activated last to reconsider their links and if it is feasible the links are reestablished such that the total overall system value is increased.

The maximum value for agents can be set to reflect an overall average system value, for example an average market price, which is mostly expected to be achievable. However the average system value can be set higher than a readily achievable value to see if it can be attained by the autonomous matching activity of agent pairs, by using compensation to fracture existing relations. In order to break an established relation between agents, compensation is offered to those agents. Compensation will only be accepted if the re-negotiated relation is to result in a relation, which is more satisfied than the one which was broken. The effect of this is to increase an overall system value, which is a collective value based on the activity of all agents. This overall system value may for example be "gross profit margin" (i.e. money) or some other quantity considered to be paramount to the system. However, it should be appreciated that the overall system value may be gauged in terms of "user satisfaction", or "time", etc.

It should be noted that a dissatisfied relation could become less dissatisfied or satisfied. It is also possible of a relation to become more satisfied by matching above the maximum value through the offer of compensation.

The present embodiment will, as long as time permits or until a new event enters the system, by using the matching activity of agents have the effect of continually optimising the overall system value. The linear negotiation strategy of starting with trying to match free agents, proceeding to dissatisfied agents and finally onto satisfied agents is especially efficient if executed on a powerful execution platform, wherein agents can keep working to optimise the system. However, because of the dynamic nature of most real systems, it is often necessary to limit the time period of agent activity for each new event.

FIG. 1 shows one scene in a virtual world consisting of resource (grey—labelled R) and demand (white—labelled D) agents. There are seven agents shown 100, 102, 104, 106, 108, 110 and 112 that are interested in establishing relations. The demand agent 100 has established a relation with the resource agent 102. This relation is established as indicated by the solid line 101. The smiling faces indicate that both agents are satisfied. Two dotted lines 105, 107 extend out from the demand agent 106 towards the resource agents 104 and 108 respectively. The dotted lines indicate that these agents are in the process of negotiations, but a valid relation has not yet been established. The smiling faces indicate that the agents are satisfied with the proposed relations so far. Thirdly, a resource agent 110 is trying to establish a relation with a demand agent 112. This relation is shown by the dotted line 111 indicating that a relation is yet to be established. Furthermore, the sad faces indicate that the agents 110 and 112 do not envisage a good match, but that there is no better relation at present.

Note that either the demand agent or the resource agent can be active. That is, it should be appreciated that for the relation 111, the resource agent 110 initiates the negotiation, which is in contrast to the other relations 101, 105, 107 of FIG. 1. This is often a preferred strategy especially in a buyers market, which is in fact the case in the scene of FIG. 1. That is, there are more resource agents (sellers) 102, 104, 108, 110 than demand agents (buyers) 100, 106, 112, which means there are less buyers to be considered for the matching process.

Once a relation has been established, such a relation can only be aborted by mutual agreement. So in FIG. 1, if a new demand enters the system, it might be considered optimal to match a previously assigned resource agent to the new demand agent. However, if this is the case, it will be necessary for all agents to agree and in order to modify the existing relation, compensation will need to be offered to the original demand agent.

The principle of self-organisation is discussed more fully herein. For dynamic resource allocation in a self-organising system consider a multi-agent system given the task of allocating n resources to m demands. In a preferred embodiment, each resource is characterised by a set of f features and having a value expressed in monetary units (mu). Each demand is characterised by a set of g features and having purchasing power also expressed in mu. Typically, demands arrive at the system one by one where the times of arrival and their characteristics are unpredictable. Resources may be constant or changeable over time.

A basic example of the algorithm for implementing dynamic resource allocation, comprises the following steps:

1. An agent is allocated to the demand as it arrives to the system. The allocated demand agent sends its characteristics in a message to all free agents requesting a resource having particular features which can be paid for with a particular number of monetary units.
2. All free resource agents having resources with the requested characteristics or with at least some of these characteristics make an offer to the demand agent.
3. The demand agent then selects the most suitable resource agent (based on their characteristics) from those offers and a match is established.
4. If no suitable resource agent is free, the demand agent seeks to obtain a suitable resource from a previously allocated resource agent, by either re-negotiating with the respective dissatisfied demand agent involved with the established relation or alternatively offering compensation to a respective satisfied demand agent for modifying its already established relation.
5. The demand agent to which the offer of compensation is made then considers the offer. The demand agent only accepts the offer if the compensation enables it to obtain a different suitable resource with improved matching criteria, i.e. closer to (or even above) its maximum value. If the offer of compensation is accepted, this has the effect of effectively reorganising the whole system, wherein the previously established relation between the original demand and resource agent is modified and a new relationship between the new demand and the released resource agent is established.
6. Process steps 1 to 5 are repeated until all resources are linked to demands and either no established relations can be improved or until the time period available for allocation has been exhausted. That is the above process is repeated until an optimal allocation of resources has been achieved within the constrained time period.

Consider the situation where at one moment in time a scene may exist where the relations between agents are satisfied and the system is in equilibrium. However at a later time, a new event is input into the system. Such an event might be a new order where a demand agent is created for this order and the system will autonomously modify existing and/or establish new relations among the agents with the end result of increasing the overall system value. This capability of autonomously re-negotiating relations in a multi-agent system is known as "self-organisation". A multi-agent system has a system in equilibrium at one moment in time where resources and demands are matched optimally. Then if an event such as a new demand disturbs the system, the system dynamically allocates resources by performing self-organisation and at a later time the system is again in equilibrium, although now the relations may have been modified with the effect of optimising the overall system value by offering compensation to agents with existing relations.

Dynamic allocation of resources is where resources need to be allocated or demands for these resources change during the allocation process in an unpredictable manner. Examples of dynamic resource allocation include:

Production logistics, which relates to the allocation of materials or components to production facilities, for example assembly robots, conveyors, metal processing machines, etc. A logistics application may have the added complexity of requiring components to be specified in time and space (see later) or frequent changes might be made to product specifications.

E-commerce, which relates to the allocation of goods or services (supply) to customer requests (demand) when customers or suppliers unpredictably join or leave the allocation process.

Staff scheduling, which relates to the allocation of tasks to staff in a business operating in a highly dynamic market.

The first two applications will now be described in more detail.

Figure 2:
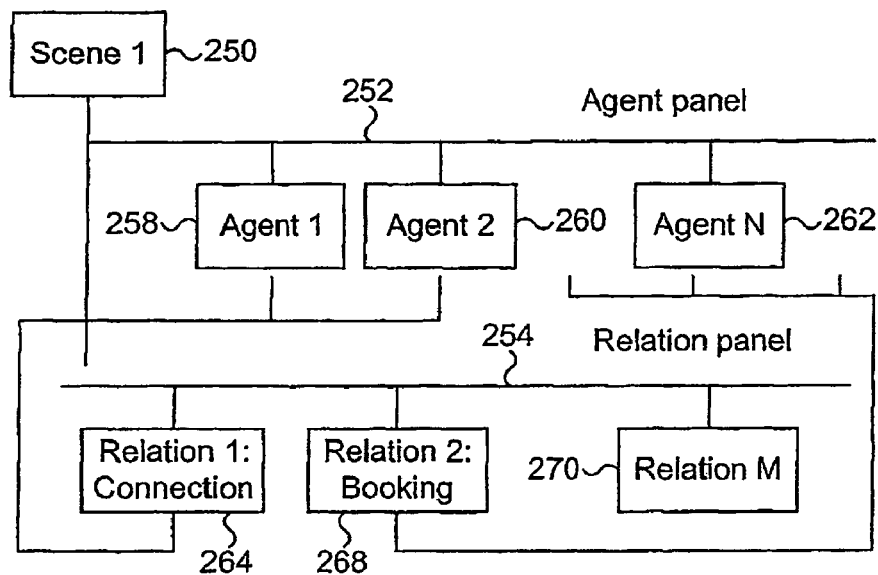
FIG. 2 shows the logical architecture of a virtual world scene according to one embodiment.

FIG. 2 shows the logical architecture of a virtual world scene according to one embodiment where every virtual world scene is defined in terms of doubly linked lists. Such a logical architecture is used by a processor to execute the various elements of such a scene. Consider a first scene 250 defined by the lists 252 and 254 where the first panel list 252 is a list of 1 to N descriptors of agents used in the scene and the second panel list 254 is a list of 1 to M relations between agents in the scene. The relations 264, 268, 270 also contain a status of the list of relations. So FIG. 2 shows that there is a first relation 264 between a first agent 258 and a second agent 260 and it is an established connection, whereas a second relation 268 is between a plurality of other agents but that the status is still in the booking stage where negotiation are ongoing between suitable agents but an established relation is yet to be reached.

As a consequence of these doubly linked lists 252, 254 a processor is able to proceed from every agent 258, 260, 262 or relation 264, 268, 270 to its neighbour. The logical architecture of this embodiment allows these lists to refer to one another so that agents can find their relations and also other agents, with whom these relations have been established. In this embodiment, the agent and relation panels 252, 254 are also divided into panels of active and inactive and satisfied and dissatisfied agents in order to reduce the processor time for searching the execution queues to the system dispatcher. The system dispatcher is responsible for generating the clock cycle for agent operations and for controlling the execution of the objects of a virtual world scene.

Figure 3:
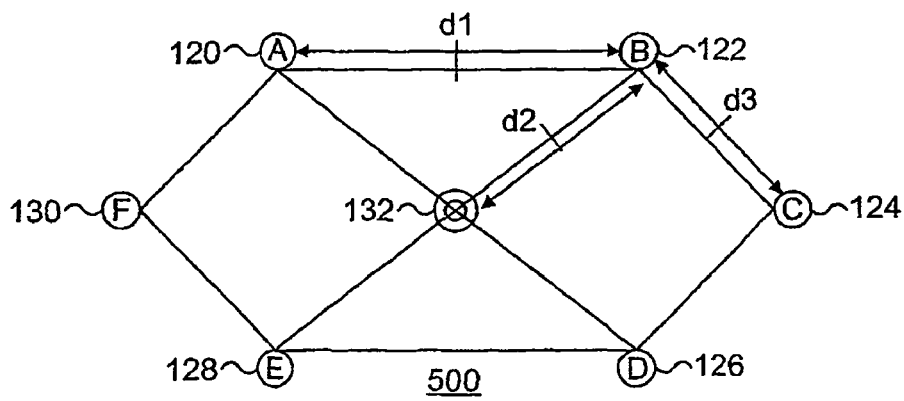
FIG. 3 shows a logistic map for an air cargo transportation example.
Figure 4:
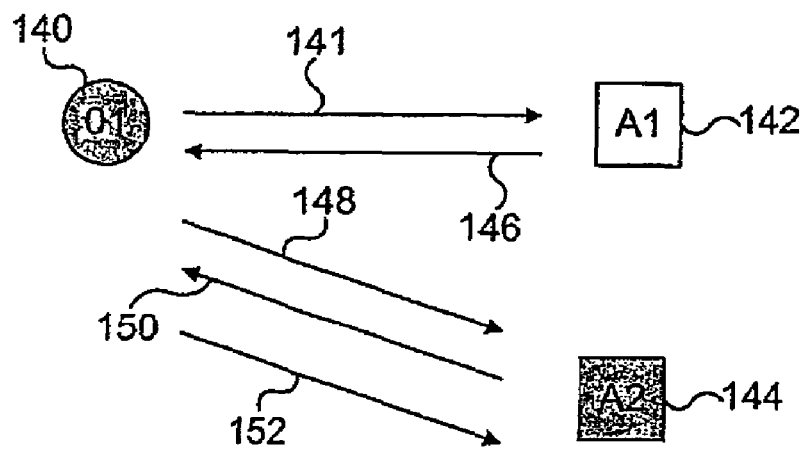
FIG. 4 shows the negotiations between agents in a first situation of the air cargo example.

Consider the specific logistics application of an airship cargo transportation system as shown in FIG. 3. For logistics applications it is often necessary to consider additional factors such as space and time, which requires a scaled map of site locations and routes with their respective dimensions and to consider at what time a resource should be allocated to a demand. FIG. 3 shows the logistics map of the airship cargo virtual world where there exists a network of sites 120, 122, 124, 126, 128, 130, 132 for loading and unloading cargo from airships, each site being labelled with a capital letter A to F and the centre site with letter O. Also, the routes between these sites are shown with their respective dimensions d1, d2 and d3 where d1=500 km, d2=250 km and d3=150 km. Two airships are used to transport cargo between the sites. Agents are assigned to each of these airships and are referred to herein respectively as "A1" and "A2". FIG. 4 shows the negotiations that occur between a new order assigned the agent referred to herein as "O1" and the agents A1 and A2.

The airship represented by agent A1 has a cargo capacity of 100 tons, moves at 10 km/h and has relatively high operating costs of 7 mu/km. The airship represented by the agent A2 has a cargo capacity of 10 tons moves at 15 km/h and has an operating cost of 3 mu/km.

Situation 1:

On 15 September the system receives an order for the transportation of a 5-ton cargo from site A to site D (500 km distance) for 15000 mu. The deadline for the cargo to reach site D is 20 September. A1 is free and located at site E, while A2 is currently transporting a previously accepted order to site C. To plan the operation, a first order agent O1 is created and assigned to the order. Agent O1 sends a request with details of the required cargo transportation to both A1 and A2. Having considered the request, each airship sends its offer to O1.

A1 is ready to start the transportation immediately. To accept the order, the airship needs to move from site E to site A (300 km). The cost is (300+500)*7=5600 mu and the time required for the execution is (300+500)/10=80 hours, ie, about 3.5 days. Therefore, A1 can meet the deadline of 20 September. A2 will have to complete its current transportation task first and then move to site A to undertake the execution of the new order O1. If A2 is currently located at site O, it will need to cover the route O-C-O-A (750 km) and then move from A-D (550 km) to complete the order A1. The time required for the execution will be (250+250+250+500)/15=83,3 hours, ie, also about 3.5 days and thus also will meet the deadline. The cost will be (250+250+250+500)*3=4500 mu.

Both A1 and A2 can handle a 5-ton cargo and both agents can meet the deadline of 20 September. Therefore the criteria to consider is which is the more costly agent. The result is that A2 is cheaper at 4500 mu, which results in a greater profit margin of 15,000−4500=11.500, whereas for A1 the profit margin is only 15,000−5600=10,400 mu.

FIG. 4 shows the negotiations between agents where the line 141 denotes the enquiry sent by O1 to A1. Line 146 denotes the reply (offer) from A1. Line 148 denotes the enquiry sent to A2. Line 150 denotes the reply (offer) from A2. Line 152 denotes the booking of A2 and the established relation between the agents O1 and A2.

Situation 2:

Now consider the case where one hour later, a new order for cargo is received by the system and is assigned a new order agent refereed to herein as "O2". That is, an 8-ton cargo needs to be transported from point C to point B (150 km) for 20,000 mu. The deadline is 17 September. Only A2 can execute this order, because A1 would not be able to meet the deadline since A1 would need (500+150)/10=65 hours, or about 3 days and therefore must not be able to meet the required deadline of 17 September (2 days away). In contrast, A2 would need only (250+150) 15=23,3 hours, or about 1 day to complete this order. However, A2 has already been booked by O1 in situation 1 above.

Thus, an enquiry from the agent O2 to agent A2 results in the following negotiation:

A2 sends a message to O1 requesting permission to be released from the previously established relation with a view to accepting O2 and offering in return an unspecified compensation O1 attempts to oblige, by contacting A1 and A2 again and receives from A1 the same offer as in situation 1, which meets its deadline, but was previously rejected as the more expensive option (10400 vs 11500 mu)

O1 asks A2 to compensate the difference, ie. 1100 mu

The O2 agent considers the request for compensation passed to it by A2. If O2 establishes a relation with A2, O2's profit will be 20 000−(250+150)*3=18950 mu. Therefore, the compensation to be paid 1100 mu to the O1 is acceptable in light of the profit which A2 expects to make from the deal 18950 mu.

Figure 5:
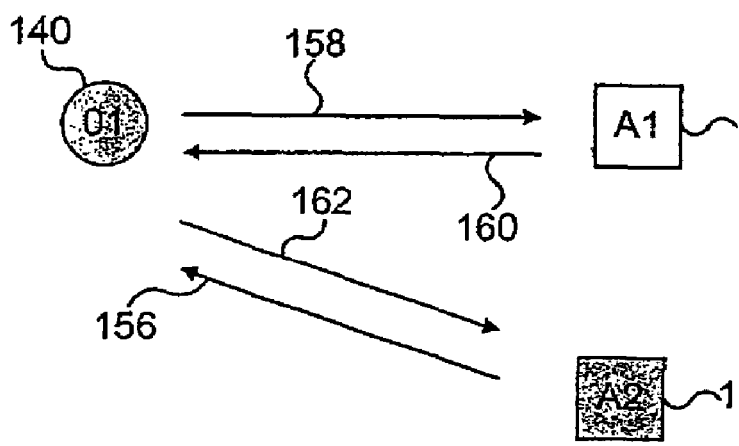
FIG. 5 shows the negotiations for self-organisation in a second situation of the air cargo example.
Figure 5:
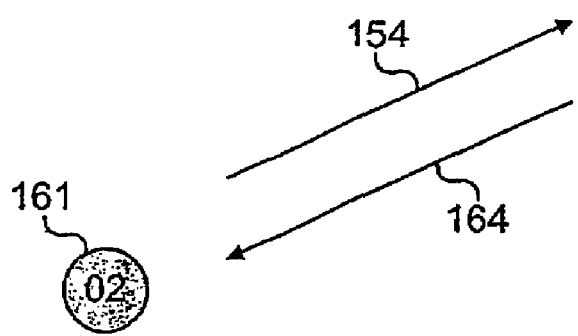

FIG. 5 shows the negotiations for self-organisation of the system to arrive at an improved overall result for the system. Line 154 denotes the enquiry from O2 to A2. Line 156 denotes the proposal for re-booking from the A2 to O1. Line 158 denotes the enquiry from O1 to A1. Line 160 denotes the positive response from A1 to O1. Line 162 denotes the permission given by O1 for A2 to be re-booked. Line 164 denotes the compensation of the O1 offer, sent by A2 to O2.

In summary, A2 is re-booked and A1 now established a relation with O1, which allows A2 to establish a relation with O2 which improves the overall value of the system A second application involving electronic commerce (E-commerce) will now be described.

Consider the example of selling cars over an Internet portal using an international network of dealers in Germany and Brazil having their own warehouses and transportation means for the delivery of cars. An agent is assigned to each order, dealer, warehouse, transportation unit, transportation slot, transportation load and car. These agents are capable of not only selling cars as is the case in existing e-commerce systems, but are also capable of self-organisation in a dynamically changing environment, thereby increasing the overall system value while still meeting the requirements of all customers. As will be described in more detail later, the agents are imbued with sufficient intelligence so that they can act autonomously by carrying out the cancellation of established relations (i.e. contracts) or the modification of these relations with the buyers' and sellers' permission.

Figure 6:
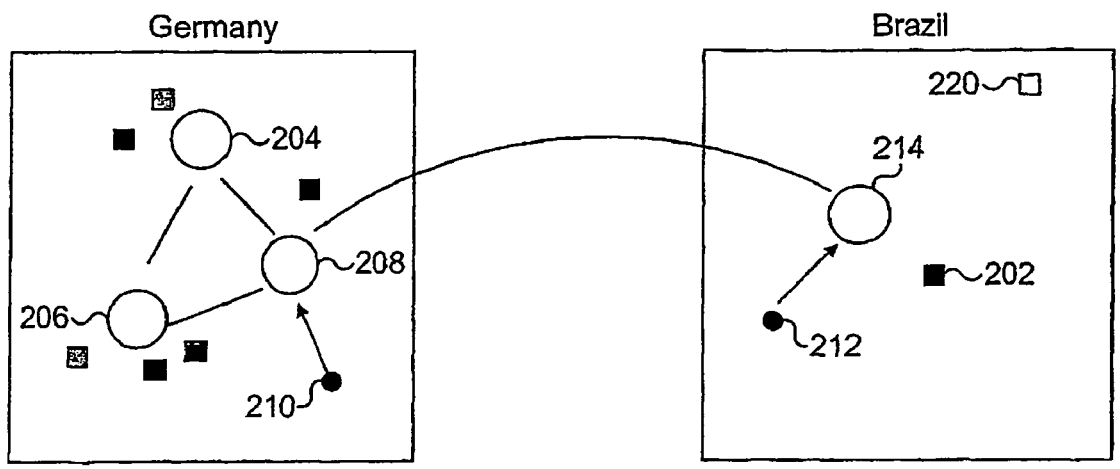
FIG. 6 shows an e-commerce application.

FIG. 6 shows an e-commerce application. A first order 212 is from a first customer residing in Brazil for a red Mercedes cabriolet 202 with a price of 50000 mu. The car has already been paid for and is now 300 meters from the customer's house, being delivered by a truck from the Brazilian dealer 214. The first customer has been waiting for it for one month already.

A second customer in Germany urgently wants to have exactly the same car and places a second order 210. Dealers in Germany 204, 206, 208 cannot find any models_of this car that match the second customers requirements in their warehouses 204, 206, 208. The multi-agent system will now try to generate for the first customer an alternative offer, which would be difficult to reject, with a view to delivering the red Mercedes 202 to the second customer.

To achieve this, the second order agent 210 sends a message to the Car agent 202 (i.e. red Mercedes) with an offer, where the compensation is not specified, to induce it to change the customer. The Car agent 202, in turn, sends a message to the first order agent 212 asking for permission to change the customer. In response, the first order agent 212 considers the situation taking into account its own and the car owner's interests. First, the first order agent 212 turns to the Brazilian dealer 214 to find out how fast it would be possible to deliver a new car with the same characteristics. Assuming a new car is possible to be delivered within one month, this doubles the waiting period of the first customer. In accordance with a simple scenario strategy (see later) of proportional compensation, the Order 1 Agent asks the second order agent 210 for a 50% discount as compensation for the doubling of the delivery period of the car. To obtain permission for the deal, the first order agent 212 contacts the first customer, for example, by ringing his WAP phone, and offers a 50% discount in exchange for the agreement to wait another month. If the first customer agrees to wait another month, the first order agent 212 cancels the booking of the initial red car 202 and books a new car 220. The second order agent 210 in turn books the car 202 for the price which now equals its initial price plus the amount of compensation: 50,000+25,000=75,000 mu.

Now, the second order agent 210 has to negotiate with an airliner for the delivery of the car back to Germany within 2 weeks. Assuming that the airliner agrees, where even if all the flights have been fully booked negotiations can be involved with other agents representing big cargo loads to give up their transportation slots in return for compensation. Thus assuming the compensation for air transport amounts to 4000 mu, the total cost of the car is now: 50,000+25,000+4,000=79,000 mu.

This price is offered to the second Customer in Germany, who will receive the negotiation report and see the decision tree (with the urgency of his order taken into account) if required. The second customer can then either accept or reject this offer. If the customer accepts, the truck driver delivering the car to the first customers house will re-route to the airport and load the car onto the designated flight to Germany. If the customer rejects, all the achieved relations are cancelled and the initially established relation is reverted to, i.e. the car is delivered to the first customers house as planned.

If compensation is accepted and both orders are executed successfully, the agents gain additional profit by meeting the demands of each participant of the deal (ie. Customer 1, Customer 2, airliner, etc.). Therefore through a process of self-organisation, the present invention is able to achieve dynamic changes with regards to relations between the market participants. It should be understood that to gain the full benefits of an e-commerce application, ideally there should be no fixed prices and no fixed terms of delivery, instead everything should depend on customers' requirements.

Figure 7:
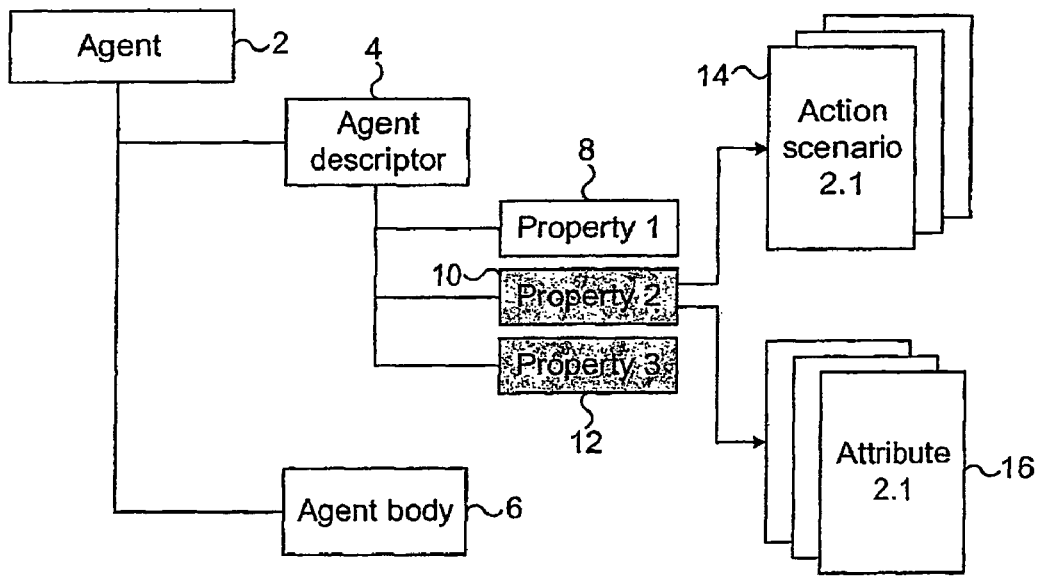
FIG. 7 shows the basic agent architecture according to a preferred embodiment of the present invention.

To achieve the possibility of carrying out self organisation as exemplified and discussed above, a particular agent architecture is described. FIG. 7 shows the basic agent architecture, which has two main parts; an agent descriptor 4 and an agent body 6. The agent descriptor 4 contains a set of properties 8, 10, 12 of the agent 2 or its relationship with other agents. The properties of an agent determine the nature of the agent. An agent property is able to refer to different scenarios 14. Each scenario can be implemented as a pre-programmed procedure that resides in a command memory 14 portion of an agent (see FIG. 8). An agent can select whichever scenario it feels will produce the optimum result. The scenario provides information on the manner of establishing a desired relation with another agent or can calculate values to check the suitability of a property for matching purposes.

Each property 10 is also capable of referring to a set of attributes 16 for matching purposes. For example, the car agent 202 in the e-commerce application has the property "colour" and the attribute "red" assigned to this property. An agent 2 has certain parts of it that can be read, for example, the agent descriptor 4 can be made "open". In the example shown in FIG. 7, property 8 is made open so that other agents can read this property provided they have a so-called virtual "visual sensor". Other parts of the agent descriptor 4, for example, properties 10 and 12, may not be opened and can only be opened by agents on request.

A visual sensor is the mechanism that is used by agents to read the open data fields of an agent descriptor 4. Typically, the sensing mechanism consists of a software procedure and data structure built into the agent body or alternatively the vision sensor mechanism can be transferred to an agent upon request from a base class held elsewhere in the system. The vision sensor mechanism can also have filters, which impose vision limitations such that only certain open parts of an agent descriptor can be read.

Figure 8:
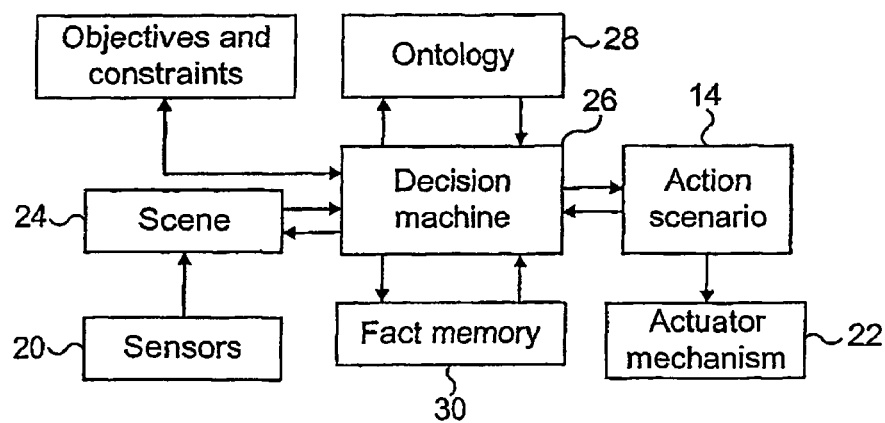
FIG. 8 shows the components of the agent body according to an embodiment of the present invention.

FIG. 8 shows the components of the agent body 6. The agent body has sensors 20, actuators 22, scene memory 24, a decision-making machine 26, ontology memory 28, fact memory 30 and command memory 14. Examples of sensor elements 20 include timers, vision sensors, mailbox mechanisms, etc. Some of these interact with other agents and some with the real world. The actuators 22 may include WAPphones, email, and means of accessing an agent's database, etc. Thus, these allow established relations to be implemented in the real physical world. Ontology memory 28 is the knowledge-base that an agent possesses. Although the ontology will be discussed in more detail later it can be broadly thought of as being a knowledge-base that can be split into two categories being a "general" knowledge base or a "domain-specific" knowledge base. Although most agents can operate fairly well with a general knowledge base it has been found more efficient in certain applications to use more domain-specific knowledge bases for example in a car production application. The sensors 20 can be used to build-up a scene memory 24 so that the agent has an idea of the surrounding virtual world. The decision-making machine 26 is the core of the agent body and interfaces with most of the other elements. It uses its own knowledge to make a decision based on its received inputs and to implement the required course of action to be output. In reaching a decision the decision-making machine 26 can also select a preferred action scenario 14 for a particular situation. For certain applications one might need the scene memory 24 but for most simple applications (for example email applications) agents really just need a general ontology memory 28 of the network.

The operation of each agent is based on a clock cycle which for example in the present embodiment is 300 µs. This clock cycle is allotted to all agents by a system dispatcher (not shown). The system dispatcher can be considered to be a unique and independent software object, which is executed on the processor to organise the activities of the agents. The system dispatcher is able to provide certain information to other agents in the virtual world. For example if an agent would like to have a virtual vision sensor if can make such a request to the system dispatcher which then forwards the relevant software to the requesting agent.

Figure 9:
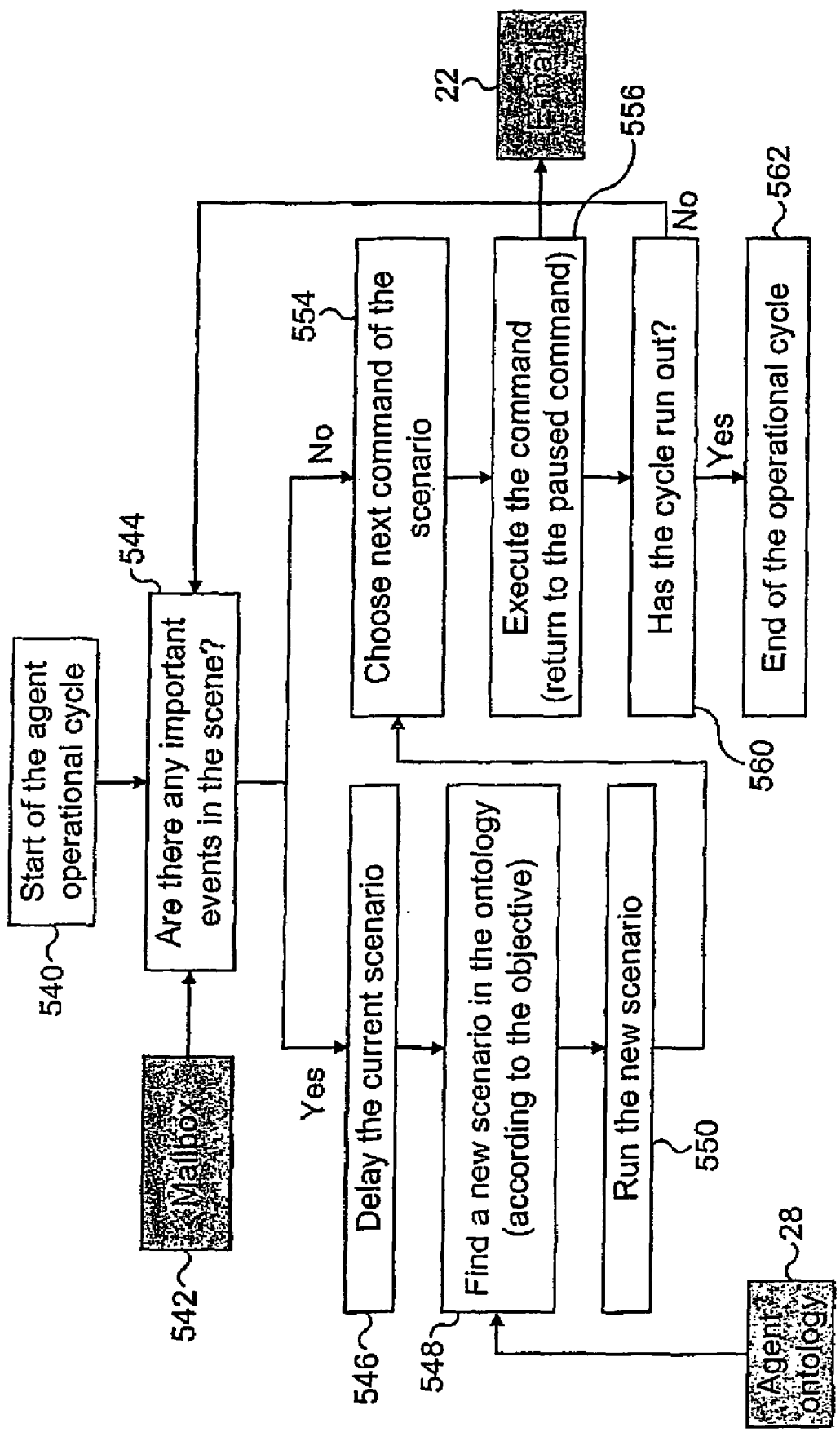
FIG. 9 shows a flow chart of the steps of an agent operational cycle.

FIG. 9 shows a flow chart describing the steps of an agent operational cycle. Step S40 indicates the start of the agent operational cycle when an agent receives a clock edge from the system dispatcher. All of the active agents in a scene operate in synchronisation by working in parallel for each clock cycle. At step S44 each agent decides whether any important events have occurred in the scene. This decision is affected by the input sensors where in FIG. 9 a simple agent having a mailbox input sensor S42 is shown. Each agent performs a check on whether the clock cycle has run out from step S60 and receives any inputs from the mailbox at S42. If there is a new event in the scene then at step S46 the current scenario is delayed and at step S48 a new scenario is selected based on the agent ontology 28. That is, the agent might decide based on the ontology to execute a different scenario, which will be most better suited, to handle the new event. If there are no new events in the scene at step S44, the agent then proceeds to step S54 where it chooses the next command of the current scenario. Also at the end of step S50 once the new scenario has been executed the agent moves to step S54. At step S56, the next command of the current scenario is executed and output to an email actuator mechanism 22. At step S60 the agent checks whether the clock cycle has expired. If not, then the algorithm is returned to step S44 where the agent checks whether any other important events have entered the scene. If the clock has expired, step S62 stipulates that the end of the agent operational cycle has been reached.

As explained, the embodiment of the agent of FIG. 9 has a mailbox as the only input sensor and email as the only actuator. For such a simple agent it is not required to have a scene memory 24, instead a general agent ontology 28 is probably sufficient. However, it should be appreciated for more complex applications, for example the logistics example described earlier, a scene memory 24 would be required in addition to the ontology memory 28. If a scene memory is not used such an agent would not know how many other agents there exist in the virtual world and what kind of agents these are.

The virtual decision-making machine 26 is the core element of the agent body and interfaces either directly or indirectly with the other elements. The decision-making machine 26 allows each agent to select a particular scenario from a set of these scenarios by comparing their descriptors. A scenario descriptor is a shortened piece of software code providing an overview of the full scenario. The decision making machine 26 takes into account the current situation of the system using the ontology and/or scene memory where a particular scenario will ultimately be selected which most efficienty meets the required criteria. The selected scenario is then activated and executed as a plurality of commands in real time. So as an example, one scenario might be a matching algorithm or another scenario might be to offer compensation, etc.

The ontology memory 28 is a knowledge base where knowledge is stored in terms of:

1. objects
2. relations
3. properties
4. scenarios, and
5. attributes.

Figure 10:
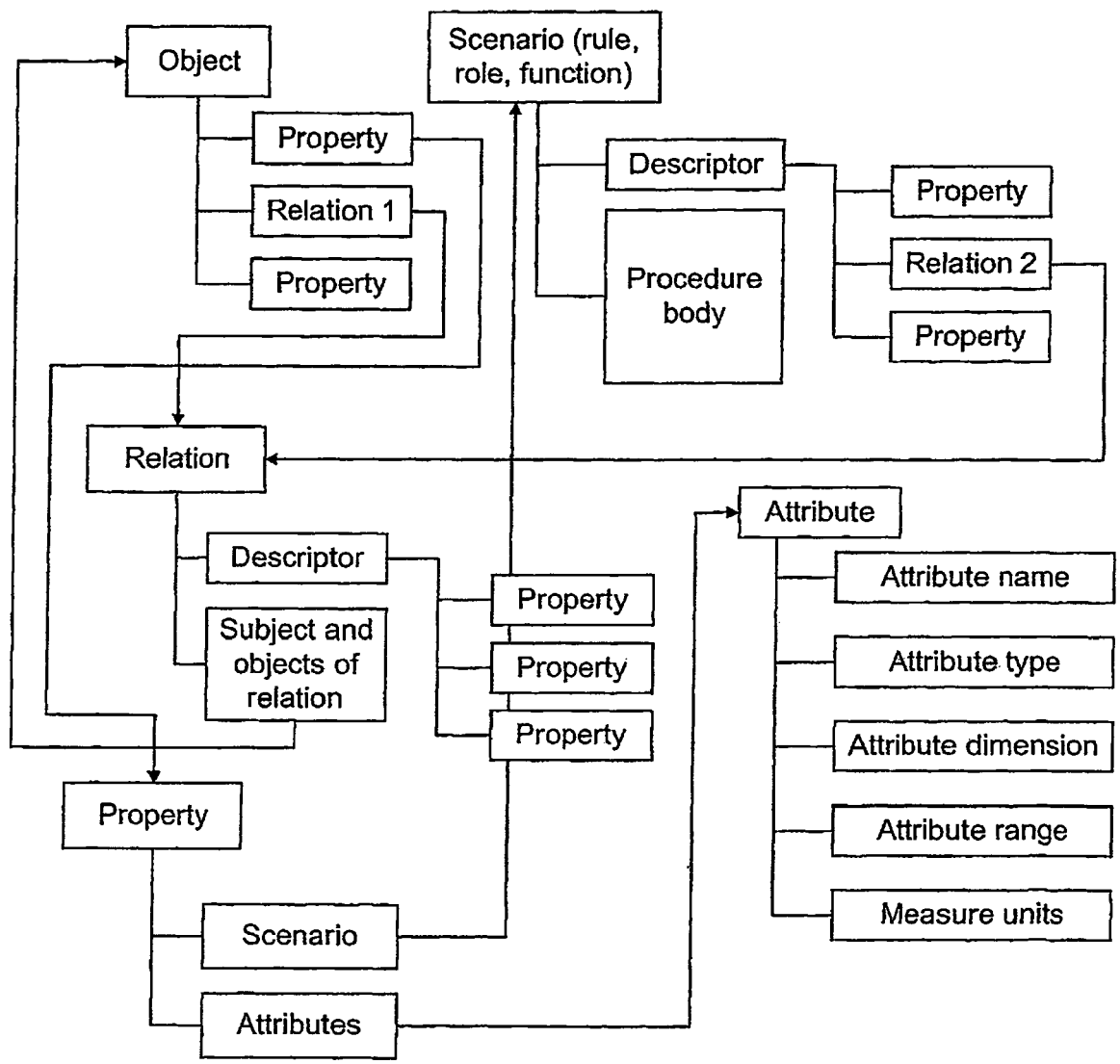
FIG. 10 shows an example of an agent's metaontology.

Metaontology is a description of all knowledge bases and describes the overall structure of ontologies. FIG. 10 shows how the basic elements of an agent ontology are interconnected. More specifically, metaontology is a semantic network having basic elements shown in the rectangular boxes of FIG. 10 as nodes and the various relations between them indicated by arrows together with the actual scenarios 14 for their interpretation. These elements and relations contain all the required knowledge for running a multi-agent system. Using metaontology, any domain knowledge can be constructed as a network of elements and scenarios. For example in the logistic and e-commerce applications described earlier the ontology will include the specification of ordered products, types of products, time needed for their production, necessary components, conditions and costs of storing components in warehouses, etc.

Certain parts of the ontology memory contain knowledge which is common to all the agents. For example, the ontology containing the catalogue of components, including production times and costs is common knowledge. This common knowledge may reside in an element common to the system such as the system dispatcher or alternatively this knowledge could be placed in the ontology memory 28 of each agent. Since each agent contains a private ontology memory it is able to provide independent access to this memory and avoids conflicts from agents trying to access this memory.

Figure 11:
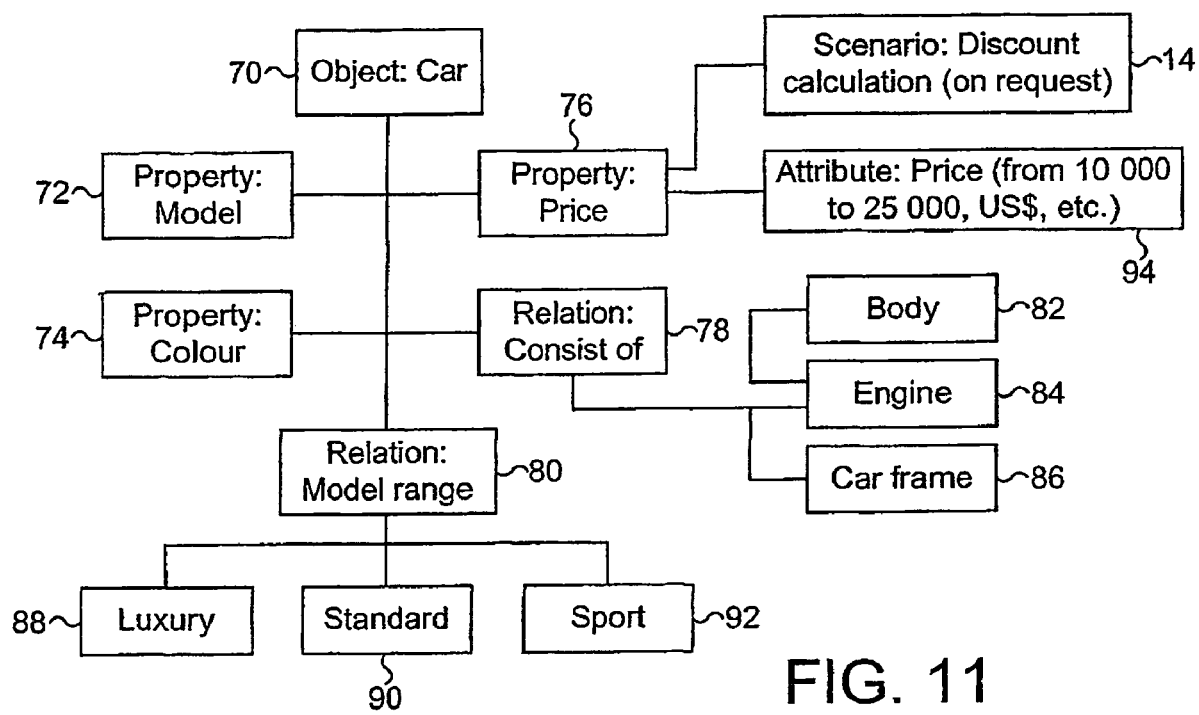
FIG. 11 shows is an example of the ontology of a car agent for the e-commerce application.

As an example consider the e-commerce application where the generalised ontology of a car agent is shown in FIG. 11. A car agent 70 is shown as having three properties: the model 72, the price 76 and the colour 74. The car 70 also consists of the relations 78 and 80. The relation 78 consists of the properties of a car 70 which are the body 82, the engine 84, and the car frame 86. The car also has a relation 80 consisting of the model range which may be one of the following properties: a luxury model 88, a standard model 90 and a sport model 92. The price property 76 is shown to include a set of discount calculation action scenarios 14. An agent is then able to select the required scenario depending on the discount calculation required. The price property 76 includes a price attribute 94, which for example gives the price range that would be acceptable to a potential buyer, for example ranging from US$10,000 to US$25,000.

It should be appreciated that there are various different discount scenarios 14 that an agent can select for the ontology shown in FIG. 11. For example, in the e-commerce application a proportional discount strategy was selected where a discount of half the car price was offered as compensation for doubling the delivery time of the car. However, the following discount scenarios might also for example be available: a "regular customer" discount depending on the number of the previous car purchases made; a "wholesales" discount depending on the number of cars purchased with one order; a "purchased with delayed delivery" discount where the customer pays in advance but can accept a delay in the delivery time or a "competitors prices" discount where the car price is comparable to or lower than competitors prices.

The action scenarios 14 may also include decision-making rules which are stored in the respective scenarios. For example, a scenario may contain rules of resource allocation based on profitability estimation or rules of estimation criteria defined by users.

The virtual decision-making machine 26 is a core element of the agent architecture (see FIG. 7). The machine 26 is implemented in a preferred embodiment as a set of procedures and data structures. The procedures are written for handling the basic data structures and actions required of an agent. For example, organising information exchange among agents, collecting information about supply and demand dynamics, finding possible connections between agents, selecting the best connection, executing decisions and scenarios or reconsidering them if the situation changes.

As explained before each agent is described by a list of its properties and their attributes. Each agent can have properties that have attributes where each attribute may have values. Alternatively, properties can also have values. So in the example of FIG. 11, the CAR agent 70 has a PRICE property 76, which has an attribute PRICE RANGE 94 from $10,000 to $25,000 where for a particular car the average car value might be $15000. So an agent may have a data structure as follows: <Property 1=Attribute 1>, <Property 2=Value 1>, ... . etc. To learn about agent properties, attributes and values, agents can exchange messages such as one agent asking another whether it has property 1 or whether the other agent has attribute 1 assigned to property 1, etc.

Some properties can be made "pen" so that these properties are visible to other agents. This reduces the number of request messages and the complexity of the scenario logic needed. Decision making is performed on the basis of the information collected from messages, by 'seeing' or 'reasoning' agent properties and attributes and from agent ontologies. Agent ontologies typically contain knowledge of the overall virtual world model and with the scenarios govern agent behaviour in different situations.

Figures 12, 14, 15:
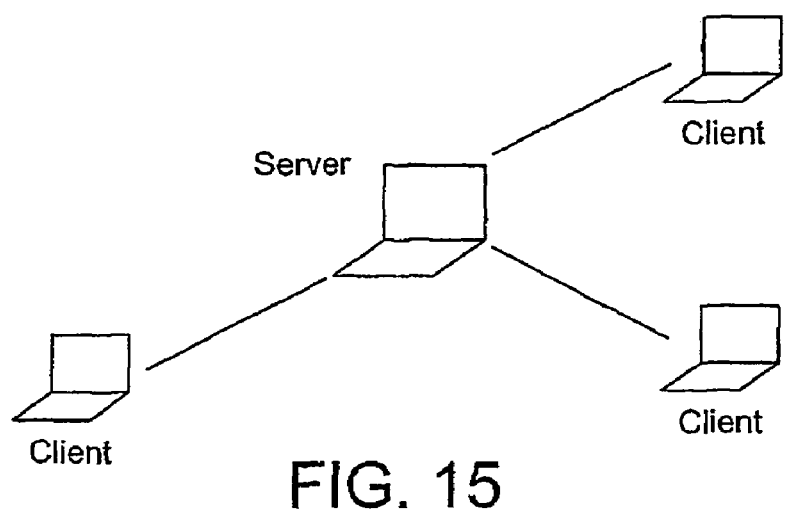
FIG. 12 shows a table of a data structure used by the decision-making machine according to an embodiment of the present invention.
FIG. 14 shows an alternative embodiment of the data structure used for decision-making machine.
FIG. 15 shows a client-server embodiment for implementing the present invention.

The typical data structure for decision-making is a table of offers with information about received proposals. An example of such a table for a demand agent in a logistics application is shown in FIG. 12. In this simple example, only three properties are shown: product class, costs and time of delivery.

The structure of the table of FIG. 12 will vary, depending on the number of properties that have been defined for an agent. The virtual decision-making machine can perform the following basic table operations: creating/deleting the table, defining or clearing fields, sorting offers according to a field and searching for a string using patterns.

The most important step is to choose the best offer. This procedure can be very complex. The simplest case is when there is a full matching possible between demand and supply so in the present embodiment when both the resource agent contains all the properties requested by the demand agent, i.e. the class of product, price and time of delivery are all matched. A more complex case is when demand and supply are close to each other as measured by an agreed metrics, i.e. partial matching. Partial (dissatisfied) matching may be when one of the properties is matched, for example if the resource agent has the same product class but the cost and time of delivery cannot be satisfied.

In a preferred embodiment, to accomplish matching between demand and resource properties a demand agent sends a request, indicating the required criteria for matching of an agents properties and their values. For example, the request message might be 'Are there any A class resources with value Z1 for property A1, importance B1, and with value Z2 for property A2, importance B2?' etc. This query may be either directed to a group of agents or broadcast to all agents. Resource agents then check their corresponding resource properties and their attributes in the ontology memory and respond. Even if they do rot match those indicated in the request, resources can be offered as possible candidates for partial matching.

There are two ways to perform the priority-based demand-resource properties matching:

1. Sequential matching of properties, starting with top-priority properties. The first demand agent sends a message to resource agents: "I am class N Demand Agent. If there are any class N Resource Agents with name S1, specify your value". After it receives their replies, the demand agent creates a 'property—value' data structure table. From the table it chooses one or more suitable offers and sends to their agents the question: "Do you have property S2? If yes, then what value does it have?" This way of performing matching allows the agent to: proceed from more important properties to less important; apply the partial matching strategy (i.e. by possibly not paying attention to properties of minor importance); reduce the number of comparing operations; keep its closed property values hidden and changing the accessibility in accordance with its negotiation strategy or market situation (for example if the number of competitors changes).

2. Parallel matching through a mediator. Demand agents disclose their open and closed properties to a mediator, who calculates indexes and returns them to agents. Agents do not know exact values of other agents' properties, but are aware of the degree of their similarity or difference as indicated by indexes.

Figure 13:
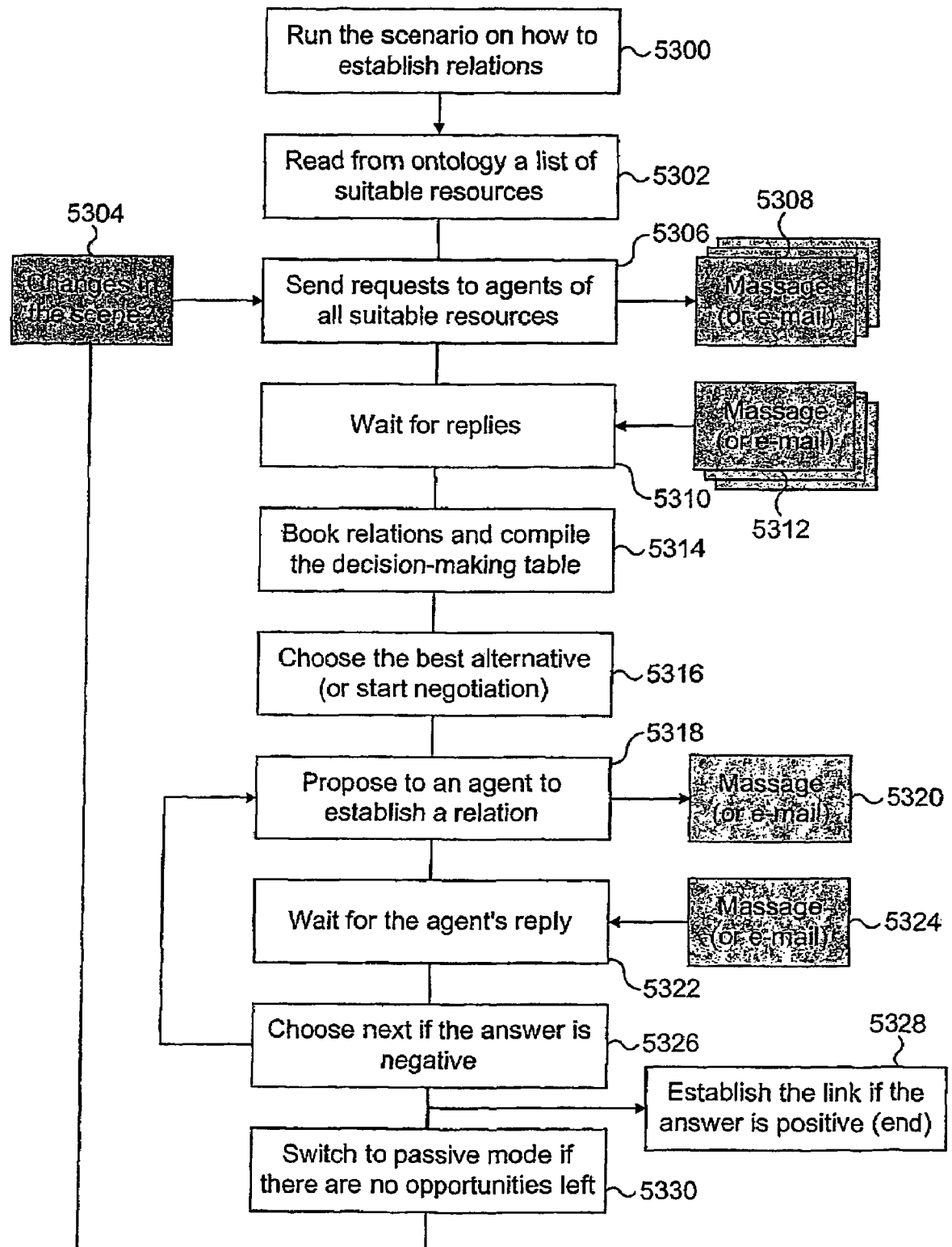
FIG. 13 shows the steps of negotiations between agents according to an embodiment of the present invention.

FIG. 13 shows an embodiment of the steps of negotiations between agents. At step S300 a scenario is run for establishing relations then at step S302 a demand agent reads from its ontology memory 28 a list of suitable resource agents. The demand agent then sends request messages S308 to all suitable resource agents at step 306. Step S306 may also be performed if there are any changes in the virtual world scene S304. At step S310 the demand agent waits for a replies from the resource agents S312. Then, at step S314 a decision making table as shown in FIG. 12 is compiled. At step S316, the best offer can be selected where at step S318, a request message is sent for establishing a relation with the chosen resource agent S320. At step S322, the demand agent waits for the reply message from the resource agent S324. If the reply is negative S326 then the negotiation procedure loops back to step S318 where the demand agent makes a proposal to the next best resource agent. If the answer is positive S328, then a relation is said to be established. Finally at step S300, once a relation has been established the demand agent switches to its passive mode until such time as there are changes in the scene S304.

A further embodiment of a data structure that is used by the decision-making machine is shown in FIG. 14. FIG. 14 gives the agent a current indication of the market, where for each product the current average price is calculated based on a history of negotiations between agents and the current demand for the product in the market. The agent is then able to determine whether there is currently an increase or decrease in the average price of the product. For example, if there is a decrease in the market it might it might be better for a resource agent to wait until the market recovers.

It should be appreciated that a multi-agent system according to the present invention might be implemented using the client-server based embodiment shown in FIG. 15. More specifically, processing and execution of the agents is performed by a server, whereas client terminals operate as a user interface allowing users located throughout the world to input or output information to or from the system. The human user can thus enter information, or receive information from the system where for example, a car salesman through his experience will have knowledge as to the average market price of a car having certain characteristics. The car salesman is then able to enter this information into the system. The client terminal transmits the entered information to the server for processing such that the ontology of each of the relevant agents in the system is updated with this knowledge, which may be used for matching purposes.

The invention claimed is:

1. An agent adapted for negotiating in a virtual environment, the agent comprising:
   an agent descriptor implemented as an executable program and comprising a set of properties which determine the negotiating characteristics of the agent;
   an agent body implemented as an executable program and comprising at least one sensor for receiving information from the virtual environment, at least one actuator for interacting with the environment, and a decision engine operable in an active state during a predetermined time period to execute a decision making process based on the information received from the at least one sensor wherein the decision engine is operable to establish a relation with another agent in dependence on the negotiating characteristics and to determine a value representing the quality of the established relation; and
   ontology memory for storing knowledge concerned with the characteristics of and relations between agents in a multi-agent system, wherein an agent is able to refer to its ontology memory to find a list of suitable agents with which to negotiate.

2. An agent according to claim 1, wherein at least some of said properties are associated with a set of attributes which define the nature of the agent.

3. An agent according to claim 1, wherein at least some of said properties each refer to a set of scenarios, each scenario comprising a sequence of commands that govern the behaviour of execution of the agent.

4. An agent according to claim 3, wherein said decision engine is operable to select from said set of scenarios the scenario considered to be most appropriate based on the information received from the at least one sensor according to the negotiating characteristics of the agent and the quality of any existing established relation that the agent has made.

5. An agent according to claim 3 wherein one of said scenarios is configured to cause the decision engine to disturb an established relation between a pair of agents by offering compensation which will improve said value.

6. An agent according to claim 3, wherein the agent body comprises command memory for holding said scenarios.

7. An agent according to claim 1, wherein the virtual environment represents a real environment including demands and resources, and wherein said agent is a demand agent allocated to a real demand.

8. An agent according to claim 1, wherein the virtual environment represents a real environment including demands and resources, and wherein said agent is a resource agent allocated to a real resource.

9. An agent according to claim 1, wherein the agent body comprises a scene memory holding data representing the current state of the virtual environment.

10. An agent according to claim 1, wherein the at least one sensor comprises means for reading accessible database fields.

11. An agent according to claim 1, wherein the at least one sensor comprises a mailbox mechanism for receiving messages.

12. An agent according to claim 1, wherein the at least one actuator comprises means for accessing a database to update data fields therein.

13. An agent according to claim 1, wherein the actuator comprises means for dispatching a message.

14. An agent according to claim 1, wherein the agent body comprises a timer for controlling said predetermined time period.

15. An agent according to claim 1, wherein said ontology memory contains common knowledge which is accessible by all agents in a multi-agent system and private knowledge which can only be accessed by said agent.

16. An agent according to claim 1, wherein said characteristics of an agent comprise properties, attributes and values.

17. An agent according to claim 1, wherein said ontology memory is domain specific so that an agent may be specially imbued with the knowledge of a particular application.

18. An agent according to claim 17, wherein said application is a logistics application.

19. A method of simulating a real environment by creating a virtual environment comprising a plurality of agents, the method comprising:
   for at least some of said agents, invoking an active state of the agent for a predetermined time period;
   for each active agent, implementing a decision making process based on the information received from the at least one sensor according to the negotiating characteristics of the agent to determine whether a relation can be established with another agent;
   after said predetermined time period invoking a passive state of the agents, wherein said agents have a free or paired status and wherein paired agents hold a value determining the quality of the relation they have established,
   wherein each agent comprises an agent descriptor implemented as an executable program and comprising a set of properties which determine the negotiating characteristics of the agent;
   an agent body implemented as an executable program and comprising at least one sensor for receiving information from the virtual environment, at least one actuator for interacting with the environment, and a decision engine operable in an active state during a predetermined time period to execute a decision making process based on the information received from the at least one sensor wherein the decision engine is operable to establish a relation with another agent in dependence on the negotiating characteristics and to determine a value representing the quality of the established relation; and ontology memory for storing knowledge concerned with the characteristics of and relations between agents in a multi-agent system, wherein an agent is able to refer to its ontology memory to find a list of suitable agents with which to negotiate.

20. A method of operating a computer to implement an agent adapted for negotiating in a virtual environment, the method comprising:

executing a first program defining an agent descriptor comprising a set of properties which determine the negotiating capability of the agent;

setting up an agent body by providing at least one sensor for receiving information from the virtual environment and at least one actuator for interacting with the environment;

executing a second program to implement a decision engine associated with said at least one sensor, said decision engine being operable in an active state during a predetermined time period to execute a decision making process based on the information received from the at least one sensor according to the negotiating characteristics of the agent wherein the decision engine is operable to establish a relation with another agent in dependence on the negotiating characteristics and to determine a value representing the quality of the established relation; and loading into a command memory a set of scenarios to which at least some of said properties refer, each scenario comprising a different set of commands.

21. A method according to claim 20, wherein said decision making process selects the most appropriate scenario from a set.

22. A method according to claim 20, which comprises compiling in a scene memory a current scene of the virtual environment for access by the agent.

23. A method according to claim 22, wherein the current scene is altered on the arrival of a new event and if the event is important then the decision making process selects a different scenario.

24. A method according to claim 23, wherein said new event is a new agent.

25. A method according to claim 23, wherein said new event is a message from an existing agent in the scene.

26. A method according to claim 23, wherein if a new event enters the scene but the event is not important then the decision making process continues to execute the current scenario.

27. A method of operating a computer system to manage demands and resources, the method comprising:

generating a scene representing the current state of resources and demands;

instantiating a plurality of agents as executable programs, including a first set of resource agents representing resources and a second set of demand agents representing demands, wherein each agent is operable to exchange messages with another agent and comprises a decision engine for executing a decision making process based on information from the scene and messages from said other agent to implement a relation with said other agent and to associate a relation value with said relation; and comparing that relation value with a reference value for the relation to determine whether the relation is satisfactory or not; and loading into a command memory a set of scenarios to which at least some of said properties refer, each scenario comprising a different set of commands.

28. A computer system configured as a virtual world representing a real world, the system comprising:

a first set of demand agents implemented as executable programs, each comprising a set of properties representing demands in the real world;

a second set of resource agents implemented as executable programs, each comprising a set of properties representing resources in the real world;

wherein the demand agents and the resource agents are operable to negotiate by exchanging messages, said messages containing said sets of properties corresponding to the demands and resources of each agent so that a decision engine can establish a relation based on predefined criteria;

wherein when a new demand or resource enters the system, an agent representing the new demand or resource is able to disturb an established relation between a pair of agents by offering compensation to improve a value representing the quality of the established relation; and wherein each agent has ontology memory for storing knowledge concerned with the characteristics of and relations between agents in a multi-agent system, wherein an agent is able to refer to its ontology memory to find a list of suitable agents with which to negotiate.

29. A computer system comprising a processor for executing a plurality of programs, each program represents an agent for negotiating in a virtual environment and a memory which stores a plurality of agent definers, each agent definer having an ontology comprising:

a set of properties defining the nature of the agent;

a set of attributes defining characteristics used for negotiating purposes by the agent;

a set of scenarios executable by the agent to implement different decision making processes; and a relation quality store for holding a value defining the quality of a relation established by the agent, wherein said ontology memory contains common knowledge which is accessible by all agents in a multi-agent system and private knowledge which can only be accessed by said agent.

* * * * *